March 24, 1970    L. A. BAILLIE    3,502,574
APPARATUS AND METHOD FOR CONVERTING HYDROCARBONS
Filed Feb. 20, 1968
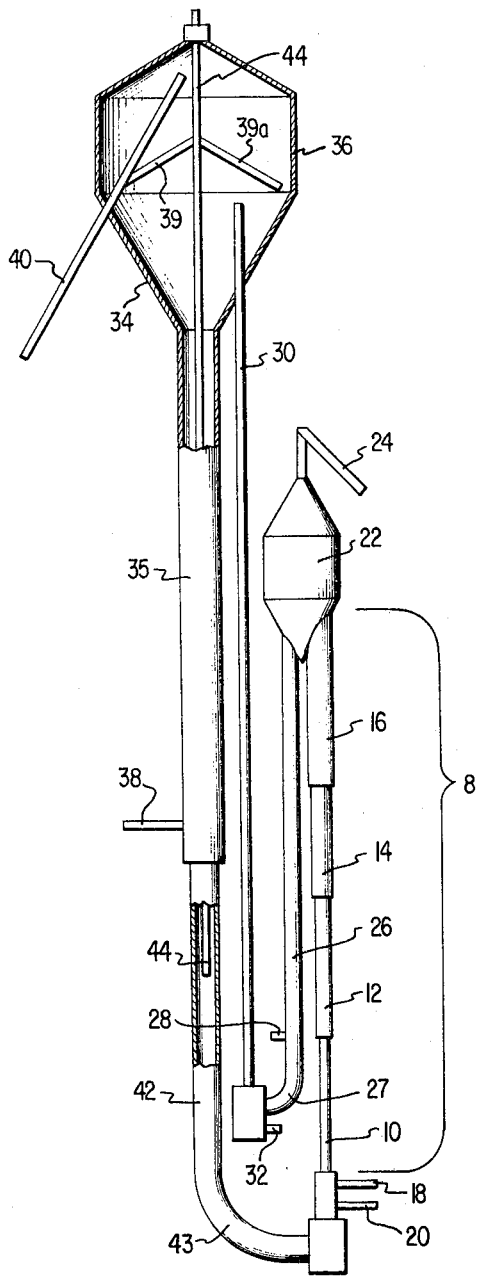
INVENTOR
LLOYD A. BAILLIE
BY  McLean, Morton & Boustead
ATTORNEYS United States Patent Office 3,502,574
Patented Mar. 24, 1970

3,502,574
APPARATUS AND METHOD FOR
CONVERTING HYDROCARBONS
Lloyd A. Baillie, Homewood, Ill., assignor to Sinclair Research, Inc., New York, N.Y., a corporation of Delaware
Filed Feb. 20, 1968, Ser. No. 706,907
Int. Cl. C10g 13/14, 35/00, 35/10
U.S. Cl. 208—148
7 Claims

ABSTRACT OF THE DISCLOSURE

A catalytic reactor in which feed and diluent gas enter the bottom of a reactor of increasing diameter along the flow path. Atop the reactor is a disengagement vessel of relatively large diameter in which the product gases are separated from the catalyst. The catalyst drops through a stripper culminating in a bend which collects catalyst to provide a seal between the reactor and a regenerator. A lift line carries the catalyst to the top of the regenerator through which the catalyst moves downward to a transfer line that returns the catalyst to the reactor. Flue gases are removed from the top of the regenerator. The transfer line culminates in a bend to collect solid catalyst, providing a seal between the regenerator and the reactor. Fluidizing gas is introduced into the transfer line by an inlet probe which can be moved vertically so that the level within the transfer line at which the gas is introduced can be varied to control the catalyst flow rate.

In catalytic chemical processes a fluid which is to be converted, commonly termed a "feed," is passed over a catalyst, and as a result the feed undergoes a chemical change. Different feeds and different desired results require use of different catalysts. As new processes and new catalysts are developed, it is advantageous to have a means of evaluating them on a small scale before committing them to large-scale systems.

Many types of systems are available for evaluating fluidized catalysts and processes. By way of example, there are fixed bed systems in which the catalyst is maintained at a fixed location, and the feed is passed through the catalyst. Use of such a fixed bed system for evaluation of catalysts and processes is slow and requires relatively large amounts of catalyst and feed. Thus, while the system itself may not be expensive, its operation is. In addition, such a system frequently does not give representative results, reducing its value for evaluation purposes. Fluidized catalyst bed testing units are also available in which the feed maintains the catalyst in a turbulent or fluidized state. In such a system both the feed and the catalyst undergo considerable mixing, and so the system must be of a large size. In addition, relatively large quantities of catalyst and feed are required, and the system may not give representative results.

Newly developed catalysts are often much more active than the catalysts which have been employed in the past, and this necessitates a high space velocity operation. As a consequence the use of a riser reactor is advantageous. However, true riser reactors are not suited for laboratory use because of their excessive height and because their fixed length makes them inflexible, for instance the space velocity and the catalyst to feed ratio can not be varied independently.

Moreover, in small reactors in which the catalyst is passed through the reactor and transferred from the reactor to the regenerator and returned to the reactor in a cyclic manner, the regulation of the small catalyst flow rate is very difficult and leads to inadequate control of the process, especially if the flow is regulated by a valve. The relatively small pressure drops existing in such units is a significant factor making such control difficult. As an example the differential pressure may not exceed about 1.5 p.s.i.

The present invention is a catalytic reactor which can be small in size and flexible in operation and yet which accurately simulates operation of a riser reactor to permit accurate evaluation of catalysts and chemical processes. The gas and catalyst flow in the reactor is progressive. As a consequence, secondary reactions of the original reaction products are reduced, and relatively small catalyst quantities can be accurately evaluated.

The reactor includes a tapered vertical column which discharges into a disengagement vessel. Feed and finely divided catalyst enter in the bottom portion of the reactor and are transported as a dense fluid phase up to the disengagement vessel from which product gases are drawn. Fluid type catalyst can be used and often has particles sized in the range of about 20 to 150 microns. The spent catalyst passes downward from the disengagement vessel in a stripper through which a stripping gas rises to remove products carried over with the catalyst. The catalyst is then gas lifted to a regenerator, e.g. as a dispersed fluid phase. A regenerating gas is introduced in the bottom portion of the regenerator. Gases are exhausted from the regenerator and can be further sampled and evaluated, if desired. The bottom portion of the regenerator is coupled to the bottom portion of the reactor to return the catalyst to the reaction system. Thus, the catalyst flows cyclically between the reactor and the regenerator. A movable gas inlet extends into a regenerator catalyst standpipe. The height of the inlet within the regenerator standpipe controls division of the catalyst between a fluidized phase and a compact phase which in turn accurately controls the catalyst flow rate into the reactor. The bottom of the stripper leads to a catalyst lift line to the regenerator. Likewise, the bottom of the regenerator standpipe leads to the reactor. A compact phase of solid catalyst accumulates in the lower portions of the stripper and regenerator standpipe and provide gas seals. The stripper and regenerator standpipe and their portions leading to or connected with the lines passing to the regenerator and reactor, respectively, can operate without valve control. The fluistatic pressure which develops across the accumulated solid phases in the stripper and standpipe bottoms and the functional resistance encountered also affect the catalyst flow rate.

These and other aspects and advantages of the present invention will be apparent from the following detailed description and claims, particularly when read in conjunction with the accompanying drawing which is a side elevation view, partially in section, of a fluid catalytic hydrocarbon cracking unit in accordance with the present invention.

As depicted in the drawing, the reactor section of the catalytic cracking unit is designated generally by reference numeral 8 and comprises a tapered vertical column. In the representative example of the drawing, reactor 8 is made up of a plurality of sections of stainless steel pipe having progressively larger diameters in the direction of catalyst flow, i.e. bottom to top. Thus four sections of pipe, designated 10, 12, 14 and 16, respectively, are joined end to end, with pipe 10 having a smaller diameter and each succeeding section having a larger diameter.

A hydrocarbon feed to be cracked to lower boiling components, e.g. a mineral gas oil which will be cracked to gasoline, is introduced to the bottom of reactor 8 at inlet 18, and a diluent gas such as nitrogen is introduced at inlet 20 to pass through the reactor with the feed and catalyst. The feed and diluent gas may be pre-heated before entering inlets 18, and 20 if desired, and the catalyst in reactor 8 is in a dense fluid phase. Disengagement vessel 22 is mounted at the upper end of pipe section 16 and since the size of the vessel is larger than pipe 16 the vessel permits expansion of the products coming out of reactor 8. The vapor products pass through outlet pipe 24 from the top of disengagement vessel 22 to product collection apparatus (not shown) to permit sampling and evaluation of the products.

The solid catalyst entering the disengagement vessel 22 falls into stripper 26 which is a length of vertical pipe having a smooth bend 27 at the bottom and leading to catalyst lift line 30. Bend 27 causes accumulation of a compact phase of solid catalyst at the bottom of stripper 26 below inlet line 28, without catching or holding up any catalyst. Nitrogen is introduced into stripper 26 at inlet 28 just above bend 27. The nitrogen removes products which may have been carried over into the stripper with the solid catalyst. This nitrogen also emerges through outlet pipe 24. The catalyst in stripper 26 which is above inlet 28 is in a fluid phase or condition and the pressure exerted by the catalyst above inlet 28 is proportional to its depth. Thus as the catalyst flow rate in reactor 8 increases the depth of catalyst in stripper 26 above inlet 28 increases to raise the differential pressure between stripper 26 and catalyst lift line 30, the catalyst in the latter is in a relatively dispersed fluid phase and exerts little, and a relatively constant, back pressure or resistance to flow.

The solid catalyst passing from the bottom of stripper 26 enters vertical lift line 30. A lifting gas such as nitrogen is introduced into the bottom of lift line 30 at inlet 32. This gas lifts the solid catalyst through the small diameter lift line to the top of regenerator vessel 34. The rate at which gas in introduced through inlet 32 is adjusted so that its velocity is great enough to lift the largest solid catalyst particles utilized, maintaining a dilute phase in the lift line.

Solid catalyst which lies in bend 27 at the bottom of stripper 26 is in a compact phase and provides a gas seal between reactor 8 and regenerator 34. The fluistatic pressure across the compact phase solids controls the rate at which the solid catalyst leaves stripper 26. The gases introduced via inlets 28 and 32 are controlled so that the fluistatic pressure in lift line 30 is less than the pressure within stripper 26. This pressure imbalence results in the flow of solids from stripper 26 into lift line 30. As operation stabilizes, the level of fluidized solid catalyst in the vertical section of stripper 26 builds up until the rate of flow of catalyst out of the stripper into lift line 30 is equal to the inlet rate of solids into the stripper from disengagement vessel 22.

Regenerator 34 comprises a vertical pipe 35 on the top of which is located a large diameter vessel 36, having as shown a 60° cone on its bottom and a 120° cone on its top. A regenerating gas such as air which burns carbonaceous deposit from the catalyst is introduced into the bottom of regenerator 34 at inlet 38. This gas from inlet 38 and the gas entering the regenerator inlet 44 maintain the material within regenerator 34 in a fluidized state during which the catalyst is regenerated, for example by removing coke from it which has formed during the fluid cracking of hydrocarbons. The resulting flue gas passes through baffles 39 and 39a which are mounted within vessel 36 to separate solids from the gas. Vessel 36 reduces the velocity of the gas, allowing settling of the solid catalyst. The flue gas is carried away by outlet pipe 40, which emerges near the top of vessel 36, above baffles 39 and 39a. Outlet pipe 40 carries the gas to other processing equipment (not shown) to permit sampling and evaluation, as desired.

Transfer line 42 couples the bottom of regenerator 34 to the bottom or reactor 8. The bottom of transfer line 42 includes a smooth bend 43 to enable connection to the reactor. Bend 43 causes accumulation of a compact phase of solid catalyst at the bottom of transfer line 42, without catching any catalyst. Nitrogen is introduced into transfer line or standpipe 42 through moveable probe 44, which passes from the top of vessel 36 through regenerator 34 into transfer line 42. This nitrogen strips the air from the catalyst, and the resulting gas leaves the system at outlet 40.

Within transfer line 42 and regenerator 34 dense fluidized catalyst exists above the lower end of probe 44. Since probe 44 can be moved vertically to adjust its depth within transfer line 42, the depth of this fluidized state can be controlled from the position of inlet 38 to the maximum insertion depth of probe 44. Below probe 44 a compact phase accumulates due to bend 43 and forms a gas seal. As probe 44 is raised, the depth of the fluidized phase is decreased, and the depth of the more compact phase in bend 43 is increased. Because of this, the pressure differential between regenerator 34 and reactor 8 is reduced, and the functional resistance to flow caused by the compact phase is increased.

Catalyst flow through the system is due to the pressure differentials across the compact phase catalyst which accumulates in bends 27 and 43. When probe 44 is raised above inlet 38, the compact phase in bend 43 is at its maximum size and the minimum pressure difference exists across the compact phase catalyst in bend 43. This pressure differential is conveniently less than that required to cause catalyst flow. As probe 44 is lowered below inlet 38, the size of the compact phase decreases, the depth of the dense fluidize phase increases and as a result the pressure differential increases, and catalyst commences to flow from transfer line 42 into reactor 8.

Within stripper 26 the catalyst level also varies with the depth of probe 44. When probe 44 is lowered, the catalyst flow rate increases and as a result the catalyst level in stripper 26 rises to increase the pressure differential across the compact phase in bend 27. As a result the catalyst flow rate through stripper 26 increases to keep pace with the flow rate through regenerator 34.

The increasing diameter of reactor 8 results in simulation of the operation of a riser reactor, but the reactor can have a small size usable, for example, in laboratory operations. Preferably, the cross-sectional area of reactor 8 increases by at least five to one from lowest section 10 to highest section 16. By way of example, each pipe section 10, 12, 14 and 16 might be a 7½ inch length of stainless steel pipe, section 10 being a piece of ¼ inch pipe, section 12 a piece of ⅜ inch pipe, section 14 a piece of ½ inch pipe, and section 16 a piece of ¾ inch pipe. This tapered reactor design permits a progressive flow and low space velocities, without great height. As a result catalyst flow can be controlled by the small pressure differentials found in the system, at a rate determined by the depth of probe 44, with no requirement for slide valves. If reactor 8 were not tapered, the catalyst feed rate would be relatively fixed, and to have flexible operation, a true riser reactor with its great height would be required.

The maximum height of the apparatus is determined by the height of regenerator 34 and its vessel 36 which must permit the catalyst in pipe 35 to be sufficiently above the outlet of reactor 8 to provide the required fluistatic pressure differentials. While the height of regenerator 34 is thus dependent upon the height of reactor 8, a regenerator height of about 15 feet above the bottom of reactor 8 is a convenient maximum usable on a small scale apparatus. In this type of equipment the diameter of the transfer line 42 can with advantage be about 0.5 to 2 inches.

If desired, the temperature within the apparatus can be controlled at various points, for example, by means of electric heating coils and thermocouples (not shown) in reactor 8, stripper 26, regenerator 34 and transfer line 42. Temperatures for cracking gas oil hydrocarbons are often in the range of about 800° to 1000° F., preferably about 850° to 950° F.

Although the above description has made reference to a preferred embodiment, it is apparent that numerous changes in structure and components could be made without departing from the invention.

What is claimed is:

1. A catalytic chemical conversion unit comprising:
   (a) a tapered, generally vertical reactor having a lower inlet and an upper outlet;
   (b) means for introducing a feed fluid into the lower portion of said reactor;
   (c) means for introducing finely divided solid catalyst into the lower portion of said reactor;
   (d) means for separating chemical reaction products from catalyst passing from the reactor outlet;
   (e) a generally vertical catalyst stripper for collecting separated catalyst;
   (f) means for introducing a stripping gas into said stripper to maintain an upper portion of the collected catalyst in a dense fluidized state and a lower portion of the collected catalyst in a compact phase;
   (g) catalyst lift means for conveying catalyst as a dispersed phase between the lower portion of the stripper and a catalyst regenerator;
   (h) means for introducing a lifting gas into acid catalyst lift means;
   (i) means for introducing a regenerating gas into said regenerator to regenerate catalyst therein and maintain the catalyst in a dense fluidized state;
   (j) transfer means for passing regenerated catalyst between said regenerator and said reactor inlet and including means for causing catalyst to form a compact phase in the lower portion of said transfer means; and
   (k) control means for introducing a fluidizing gas into said transfer means to vary the relative amounts of fluidized and compact catalyst in said transfer means to control the rate of catalyst flow to said reactor.

2. A unit as claimed in claim 1 in which said control means is vertically movable at levels below said regenerating gas introducing means to control catalyst flow.

3. A unit as claimed in claim 2 in which said control means comprises a pipe passing through said catalyst regenerator to said transfer means and vertically movable within said regenerator and said transfer means.

4. A unit as claimed in claim 1 in which said reactor comprises a plurality of vertical pipes coupled end to end with increasing diameter from said reactor inlet to said reactor outlet.

5. A catalytic hydrocarbon chemical conversion process comprising:
   (a) passing a hydrocarbon feed fluid to be chemically converted and finely divided solid catalyst as a dense fluidized phase through a reactor zone of progressively larger diameter in the direction of flow;
   (b) separating chemical reaction product from the catalyst;
   (c) passing a stripping gas through the separated catalyst in a dispersed phase to remove products from the separated catalyst while maintaining a first lower portion of collected catalyst in a dense fluidized state and a second upper portion of collected catalyst in a compact phase;
   (d) withdrawing catalyst from said first lower portion and lifting the withdrawn catalyst as a dispersed fluid phase to an elevated regeneration zone;
   (e) passing a regenerating gas through said catalyst in said regeneration zone while maintaining the catalyst in a dense fluidized state;
   (f) collecting regenerated catalyst below the inlet of the regenerating gas;
   (g) passing collected regenerated catalyst to said reactor zone while maintaining a lower portion of collected catalyst in a compact phase;
   (h) introducing a fluidizing gas into said regenerated collected catalyst to vary the relative amount of fluidized and compact collected catalyst to control the rate at which regenerated catalyst is passed to said reaction zone.

6. The process of claim 5 in which the catalytic chemical conversion comprises cracking a hydrocarbon.

7. The process of claim 6 in which the feed fluid is a petroleum gas oil and in which the chemical reaction product contains gasoline.

References Cited

UNITED STATES PATENTS

| | | | |
|---|---|---|---|
| 2,835,629 | 5/1958 | Berg | 208—148 |
| 2,968,608 | 1/1961 | Jewell | 208—150 |
| 3,041,273 | 6/1962 | Smith et al. | 208—153 |
| 3,406,112 | 10/1968 | Bowles | 208—153 |

HERBERT LEVINE, Primary Examiner

U.S. Cl. X.R.

23—288; 208—150, 153